United States Patent [19]

Lyga

[11] Patent Number: 5,726,393
[45] Date of Patent: Mar. 10, 1998

[54] FIXED TRANSPORT ASSEMBLY FOR MAIL WEIGHING SCALE

[75] Inventor: Thomas M. Lyga, Torrington, Conn.

[73] Assignee: Pitney Bowes Inc., Stamford, Conn.

[21] Appl. No.: 272,408

[22] Filed: Jul. 8, 1994

[51] Int. Cl.$^6$ .......................... G01G 19/40; G01G 19/00
[52] U.S. Cl. .......................... 177/25.15; 177/145; 177/184
[58] Field of Search .......................... 177/25.15, 119, 177/145, 184

[56] References Cited

U.S. PATENT DOCUMENTS

| | | | |
|---|---|---|---|
| 4,787,046 | 11/1988 | Feinland et al. | 364/464 |
| 4,856,602 | 8/1989 | Cordery et al. | 177/210 FP |
| 4,932,488 | 6/1990 | Tsay | 177/145 |
| 5,014,797 | 5/1991 | Dolan et al. | 177/25.14 X |
| 5,170,857 | 12/1992 | Phillips et al. | 177/145 |
| 5,190,115 | 3/1993 | Dolan et al. | 177/25.15 |
| 5,269,220 | 12/1993 | Doery et al. | 101/91 |
| 5,326,938 | 7/1994 | Tolson | 177/145 X |
| 5,434,366 | 7/1995 | Troisi | 177/145 X |

*Primary Examiner*—Michael L. Gellner
*Assistant Examiner*—Randy W. Gibson
*Attorney, Agent, or Firm*—Steven J. Shapiro; Melvin J. Scolnick

[57] ABSTRACT

A mail piece weighing scale for use with automated mail processing apparatus in which a plurality of mail processing components are disposed along a feed path for processing mail pieces moving seriatim along the feed path. The weighing scale has a platform, the upper surface of which is aligned with and forms a segment of the feed path. A transport means for moving mail pieces across the scale platform is mounted on the platform so that the platform and the transport means form an integral unit which constitutes the tare weight of the scale when it is calibrated to register 0 weight. The transport means includes a pair of transport units mounted beneath the scale platform with drive elements thereof protruding through apertures in the platform so as to contact mail pieces disposed on the upper surface, and a resilient pressure means is mounted on the scale platform in overlying relationship to both of the transport units so as to press mail pieces into firm driving engagement with the drive elements of the transport means. The platform and transport means assembly is mounted on a load cell which in turn is mounted in a base frame, with the result that the transport means does not have to be retracted beneath the surface of the platform in order for the scale to weight mail pieces.

4 Claims, 5 Drawing Sheets

FIXED TRANSPORT ASSEMBLY FOR MAIL WEIGHING SCALE

BACKGROUND OF THE INVENTION

The present invention relates generally to the field of mail weighing scales which are incorporated into automated mail processing apparatus, and more particularly to a weighing scale in which a mail piece transport assembly is fixedly mounted on the platform of the scale and therefore is part of the tare weight, but which still permits the scale to sense the weight of the mail pieces.

Automated mail processing apparatus is well known and widely used in large volume mailing applications where a high throughput speed is essential. Such apparatus generally comprises a plurality of processing components disposed along a feed path for mail pieces which are fed seriatim from one station to another. In known automated mail processing apparatus, mail is stacked in the hopper of a separator and feeder component which feeds the mail pieces into an envelope flap closure and sealer component where the flaps are moistened, folded over and sealed. The mail pieces are then fed onto the platform of a weighing component which weighs each piece, either to ensure that it's weight is within preset limits for the application of a preset amount of postage, or to change the postage amount printing wheels of a postage meter component to cause it to print a different amount of postage. The mail pieces are than either in position to have postage printed thereon, or are fed to a further advanced position for printing, depending upon the size of the mail pieces. In either case, after an appropriate amount of postage is printed on the mail pieces, they are ejected into a suitable stacker.

In order to achieve maximum efficiency from mail processing apparatus such as briefly just described, it is most desirable for an operator to be able to deliver a batch of mail to the processing equipment in the form of "mixed mail," that is, each batch is comprised of a large number of mail pieces of varying dimensions, particularly, thickness and weight. The ability of an automated mail processing apparatus to process a large variety of mixed mail eliminates the need for an operator to presort the mail. It is further desirable for mail processing equipment to be able to weigh individual mail pieces and affix appropriate postage value indicia in accordance with the weight of the mail pieces. It is also essential that the mail processing equipment imprint a quality indicia upon each mail piece regardless of thickness in the range of a postcard up to envelopes approximately one quarter (¼) of an inch.

As alluded to above, as the stream of mail pieces passes over the scale, each piece is momentarily stopped on the scale platform for weighing, and is then passed on to a printing position or is held stationary depending on the length or size of the mail piece then being weighed. Mail processing apparatus of the type under consideration typically has three modes of operation; in one, the scale senses the weight of each individual mail piece and automatically sets the postage printing wheels of the postage meter to print the appropriate amount of postage for that mail piece. In another, the scale is preset to a maximum amount of weight, and mail pieces which exceed the preset weight are ejected from the apparatus without postage being printed thereon. In a third, the scale is simply turned off, and the postage meter is set to print any desired amount of postage as determined by an operator for mail pieces of known weight.

Although mail processing apparatus of the type under consideration works rather well, there are certain drawbacks which affect the marketability and efficiency of operation of such apparatus. One such drawback is complexity of construction. It should be apparent that apparatus of the type under consideration is relatively complex and requires a large number of parts, components and subassemblies to render it capable of performing the tasks for which it was designed, and doing so at sufficiently high speeds and with sufficient reliability to make it commercially acceptable. As a result, mail processing apparatus of this character tends to be very costly, thereby limiting the class of customers that can afford to acquire it.

Another such drawback is speed, a factor for which this type of apparatus was initially designed to accomplish. It is essential that the apparatus operates at a maximum achievable speed in order to be cost effective, yet the more complex the apparatus becomes, the more difficult it is to maintain maximum operating speeds. The essence of the problem is that, as in any apparatus that has many processing features in a total processing system, the total process can only proceed as fast as the slowest component in the system.

A third drawback is reliability, which is also a factor which this type of apparatus was designed to accomplish. Again, as with speed, the more complex the apparatus becomes, the less reliable it is in the sense that there is more opportunity for malfunction. It is critical that mailing machines of this character be as flawless in operation as possible, since down time, whether from jamming of mail pieces, parts breaking or unacceptable indicia printing, greatly reduces the cost effectiveness of the apparatus, not to mention the additional cost of service or repair by the manufacturer's service representatives.

BRIEF SUMMARY OF THE INVENTION

The foregoing drawbacks and other disadvantages of heretofore known automated mail processing apparatus are largely alleviated if not altogether eliminated by the present invention. The invention is directed toward various alterations and modifications in the scale component of the mail processing apparatus with a view toward simplifying the construction and increasing both the speed of operation and the overall reliability of the scale.

A highly significant unique feature of the scale of the present invention is that the heretofore complex transport assembly, a portion of which moves mail pieces onto and off of the scale platform, has been replaced with a much simpler, faster and more reliable transport assembly. In prior machines, it was necessary for the mail piece drive means of the transport assembly to be retracted below the level of the upper surface of the scale platform in order for the weight of the mail piece to be imposed on the scale platform for weighing. The scale platform is supported by a load cell which senses the weight of the mail piece and sends an electrical signal to an appropriate processing component which converts the electrical signal into a readable weight value. In prior machines this could not take place so long as the mail piece drive means, which is not part of the weighing platform itself, supported the weight of the mail piece. Thus, relatively complex structure was required to cause the transport assembly to be vertically displaceable from an operable position in which the mail piece drive means is above the upper surface of the scale platform to a retracted position in which the drive means is below the upper surface of the scale platform. This construction was costly, the operation of it consumed time both before the mail piece could be effectively weighed and then before it could be further moved, and obviously it provided opportunity for malfunction or breakdown.

In the present invention, the entire transport assembly, consisting of the parts which contact the mail pieces and all of the supporting and driving parts and components associated therewith, are fixedly mounted on the scale platform. Thus, the entire transport assembly becomes part of the tare weight of the scale that is supported by the load cell when the scale is calibrated to register 0 weight. The result of this construction is that all of the mechanism formerly required to vertically displace the mail piece drive means between the aforementioned positions is eliminated, together with the time required for it to operate, thereby achieving the stated objectives of reducing cost and increasing speed and reliability.

Another very significant advantage of the present invention is that, by virtue of providing a mail piece drive unit that is stationary relative to the scale platform, it becomes possible to provide an auxiliary mail piece driving unit which is disposed adjacent the opposite or outboard edge of the scale platform from that of the principal driving unit, which is traditionally located adjacent the inboard edge of the scale platform. The advantage of providing the auxiliary driving unit is that large envelopes can be fed in a vertical orientation with respect to the scale platform with better control over longitudinal alignment when they are fed adjacent two opposite edges rather than only one, which often resulted in large envelopes skewing slightly when they are stopped and started.

In its broader aspect, the present invention resides in an automated mail processing apparatus having means defining an elongate feed path, a plurality of processing components disposed along the feed path for processing mail pieces moving seriatim along the feed path, transport means for feeding mail pieces past the processing components, and a weighing scale interposed in the feed path between certain of the components for weighing mail pieces which are momentarily stopped thereon. The weighing scale comprises a mounting base, a load cell fixedly connected to the mounting base, and a scale platform mounted on the load cell and positioned such that the upper surface of the scale platform is aligned with and forms a segment of the feed path. There is a transport means for moving mail pieces across the scale platform from one end thereof to the other. Finally, there is means for mounting the transport means on the scale platform so that the tare weight of both the scale platform and the transport means is imposed on the load cell prior to the load cell being subjected to the weight of a mail piece.

In some of its more limited aspects, the present invention includes means for securing the transport means to the underside of the scale platform with the mail piece drive means extending through suitable apertures in the scale platform slightly above the upper surface thereof so as to support the mail pieces. The transport means includes resilient pressure means mounted on the scale platform in overlying relationship to the drive means for maintaining the mail pieces in firm driving engagement with the drive means, the pressure means also forming part of the tare weight on the load cell.

The invention also includes a plurality of transport units, including, in the preferred embodiment, two transport units disposed in spaced parallel relationship relative to the direction of feed of mail pieces along the feed path. Each transport unit includes a drive means having a portion thereof projecting above the upper surface of the scale platform through suitable apertures therein to move mail pieces across the platform from one end thereof to the other. There is a separate resilient pressure means overlying the scale platform for each transport unit for pressing the mail pieces into firm driving engagement with each driving means. Both transport units are driven from a common motor to eliminate any possibility of mail pieces, particularly those that are large and/or bulky, from skewing out of proper alignment during movement along the scale platform as would result if the transport units were not operated in synchronism.

Having briefly described the general nature of the present invention, it is a principle object thereof to provide a mail piece weighing scale for use in an automated mail processing apparatus which eliminates a major problem inherent in similar prior art weighing scales and yet retains the beneficial aspects thereof.

It is another object of the present invention to provide a mail piece weighing scale in which the transport means for moving mail pieces across the platform of the scale is fixedly mounted on the scale platform so as to form a part of the tare weight of the scale, thereby eliminating the complex mechanism required in prior art weighing scales for retracting portions of the transport means beneath the upper surface of the scale platform while a mail piece is being weighed.

It is still another object of the present invention to provide a mail piece weighing scale which has an improved mail piece transport system in which mail pieces are moved by a plurality of drive means disposed in spaced parallel relationship laterally of the scale platform, thereby eliminating the possibility of mail pieces skewing out of proper alignment during feeding.

It is yet another object of the present invention to provide a mail piece weighing scale which is less complex in construction than similar prior art weighing scales, is therefore less costly to manufacture and requires less maintenance and/or service to maintain consistent and reliable operation.

These and other objects and advantages of the present invention will become more apparent from an understanding of the following detailed description of a presently preferred embodiment of the invention, when considered in conjunction with the accompanying drawings.

DETAILED DESCRIPTION OF THE INVENTION

Figure 1:
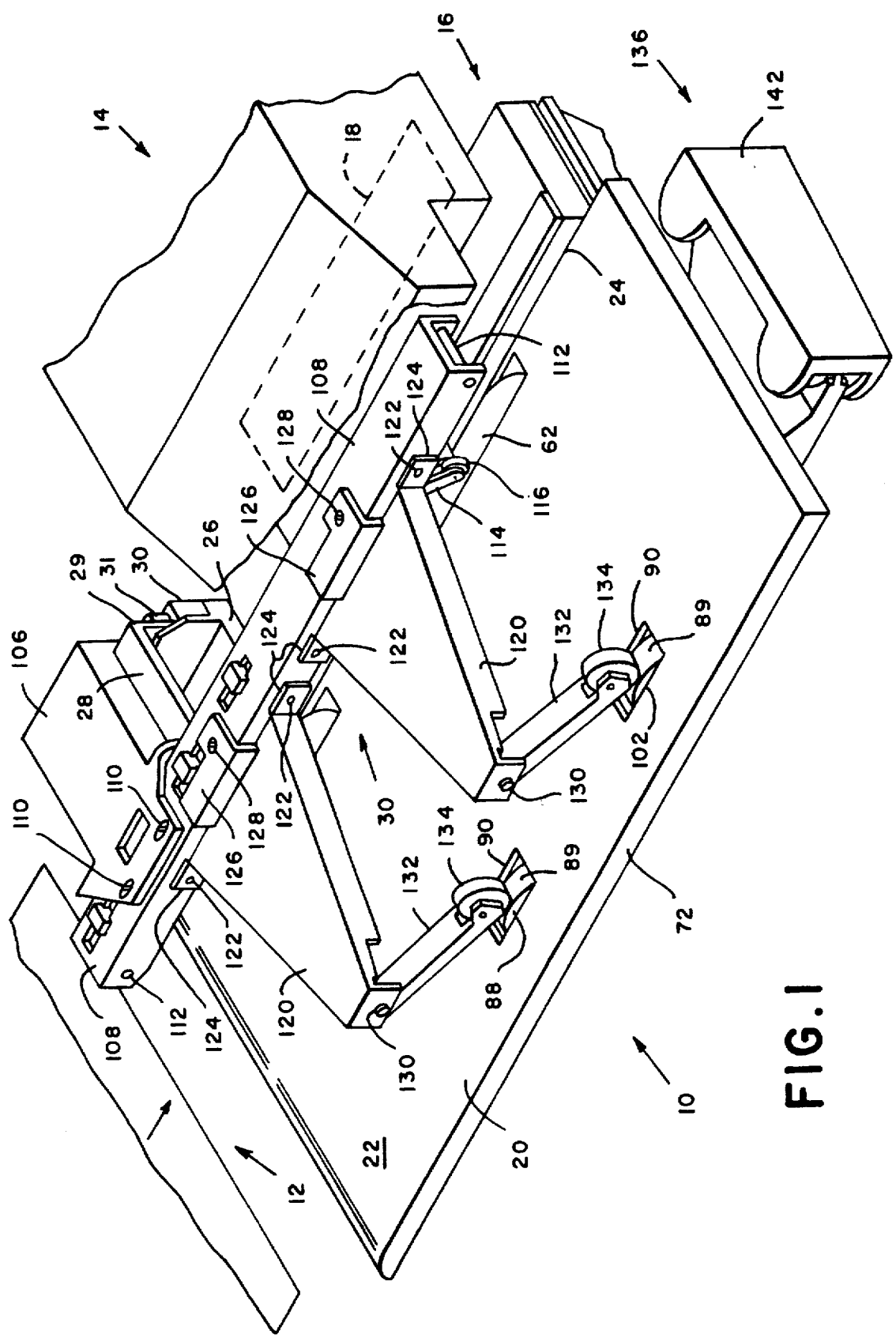
FIG. 1 is a perspective view of the major components of a mail piece weighing scale embodying the present invention, also showing the relationship between the weighing scale and a postage meter printing device.

Referring now to the drawings, and particularly to FIG. 1 thereof, the present invention resides in a mail piece weighing scale, generally designated by the reference numeral 10. The scale 10 is interposed between a suitable feeding module (not shown) from which mail pieces, generally designated by the reference numeral 12, are fed seriatim to the scale 10, where they are weighed prior to a postage indicia being printed thereon by a postage meter module, generally designated by the reference numeral 14. The details of the postage meter 14, and the manner in which the postage indicia is printed, need not be set forth herein for an understanding of the present invention, other than to note that, after a mail piece 12 is properly positioned on the scale 10 by a transport assembly (fully described hereinafter), a suitable platen assembly, generally designated by the reference numeral 16, which is disposed beneath the upper right hand corner of the mail piece 12, is caused to move vertically upwardly to press the upper surface of that portion of the mail piece into contact with the lower surface of a printing die 18 which is fixedly mounted in the postage meter 14. The platen assembly is then lowered and the mail piece is ejected from the scale 10. For further details on the structure and operation of the printing mechanism, reference is hereby made to U.S. Pat. No. 5,269,220, issued Dec. 14, 1993, and assigned to the assignee of this application.

Figure 2:
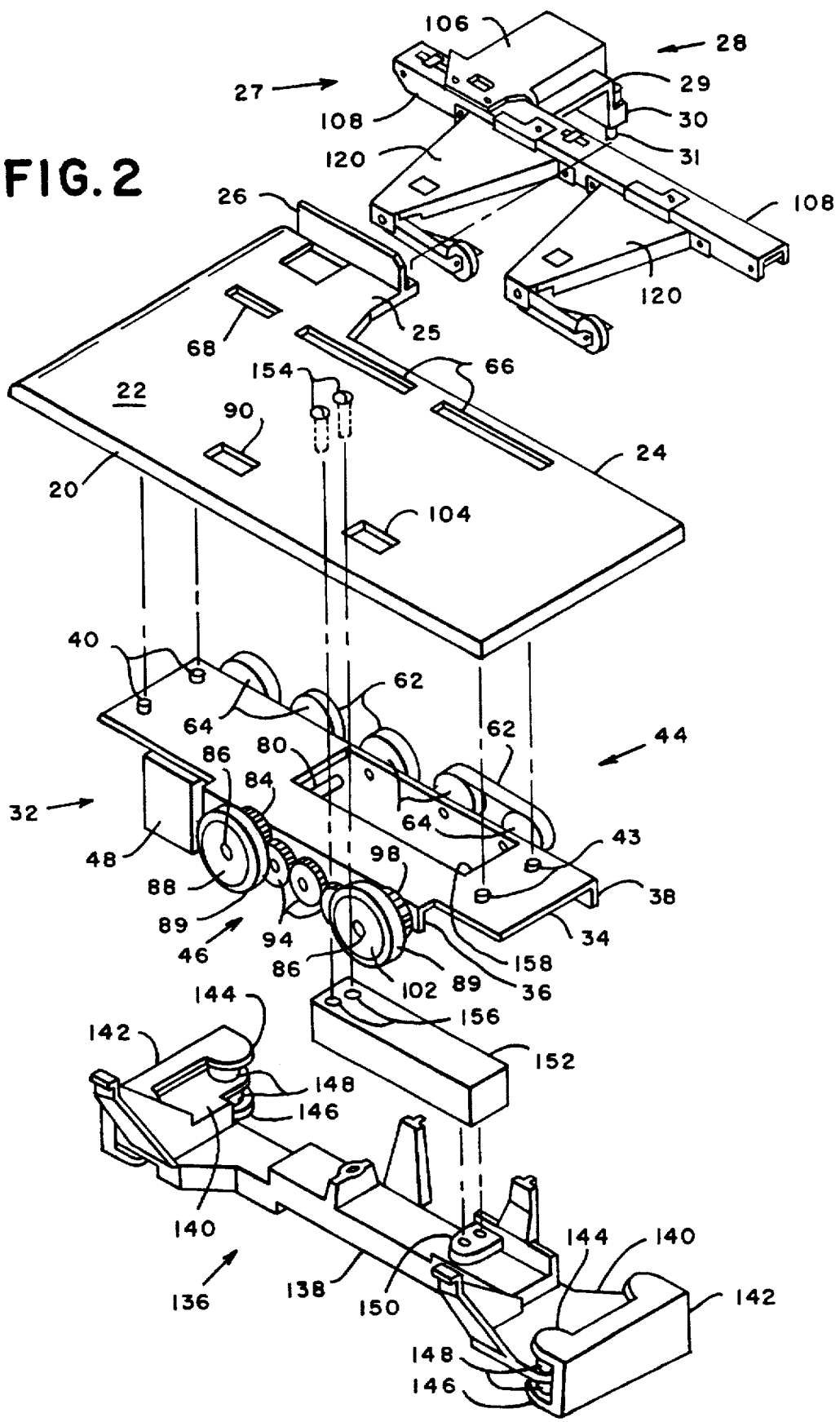
FIG. 2 is an exploded view showing the weighing scale of FIG. 1 with further details of the transport means and the mounting base revealed.

Referring now to FIGS. 1 and 2, the scale 10 includes a generally rectangular platform 20 having an upper surface 22 for supporting mail pieces 12 and a rear edge 24 extending along a major portion of the length of the platform 20, the rear edge 24 being located directly adjacent to the aforementioned platen assembly 16 so that the platen assembly 16 can rise above the level of the upper surface 22 of the platform 20. The platform 20 includes a relatively short lateral extension 25 disposed at the upstream end of the rear edge 24, and an upstanding flange 26 is formed along the length of the platform extension 25 adjacent the rear edge thereof. The lateral extension 25 and the flange 26 (which also functions as a mail guide) provide a means for rigidly mounting a pressure roller assembly, generally indicated by the reference numeral 27 (and hereinafter fully described) to the platform 20 by means of an L-shaped mounting bracket generally designated by the reference numeral 28, which has a rearwardly facing depending wall 29 which terminates downwardly in a thick laterally extending flange 30 through which a plurality of screws pass and are threaded into the upper surface of the lateral extension 25 behind the flange 26.

Figure 5:
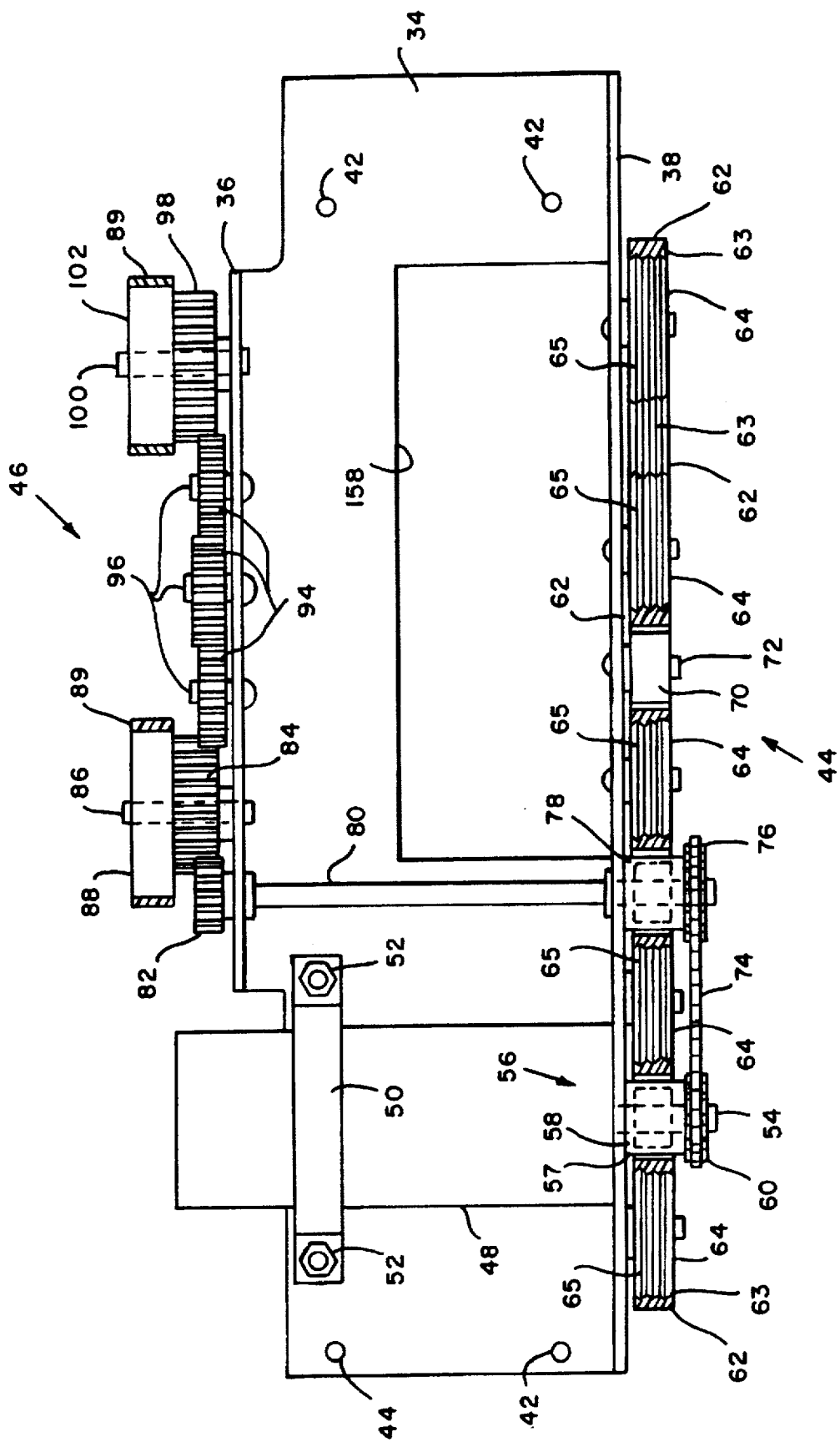
FIG. 5 is a plan view of the transport units and the mounting bracket therefore, looking upwardly from the underside of the mounting bracket.

With particular reference now to FIGS. 2 and 5, the scale 10 includes a mail piece transport means, generally designated by the reference numeral 32, for receiving mail pieces 12 from the aforementioned upstream feeding module and for positioning the mail pieces properly on the platform 20 for weighing (as hereinafter more fully described) and for printing of the postage indicia (as previously described). The transport means 32 comprises a generally rectangular frame plate 34 having oppositely facing downturned flanges 36 and 38 disposed along portions of the front and rear edges of the frame plate 34. The frame plate 34 is rigidly secured to the underside of the platform 20 by means of screws 40 which pass through apertures 42 in the frame plate 34 and are threaded into the platform 20.

The mail piece transport means 32 also comprises at least one transport unit, but in the preferred embodiment includes two independent transport units, a unit generally designated by the reference numeral 44 and a forward unit generally designated by the reference numeral 46. The rear transport unit 44 is mounted on the rear downturned flange 38, while the forward transport unit 44 is mounted on the forward downturned flange 36. Both transport units 44 and 46 include drive means (hereinafter fully described) for moving mail pieces along the upper surface 22 of the platform 20, and both drive means are driven from a common motor 48 which is rigidly secured to the frame plate 34 by means of strap 50 which extends around a portion of the frame of the motor and is secured to the frame plate 38 by suitable screws and nuts 52.

Figure 3:
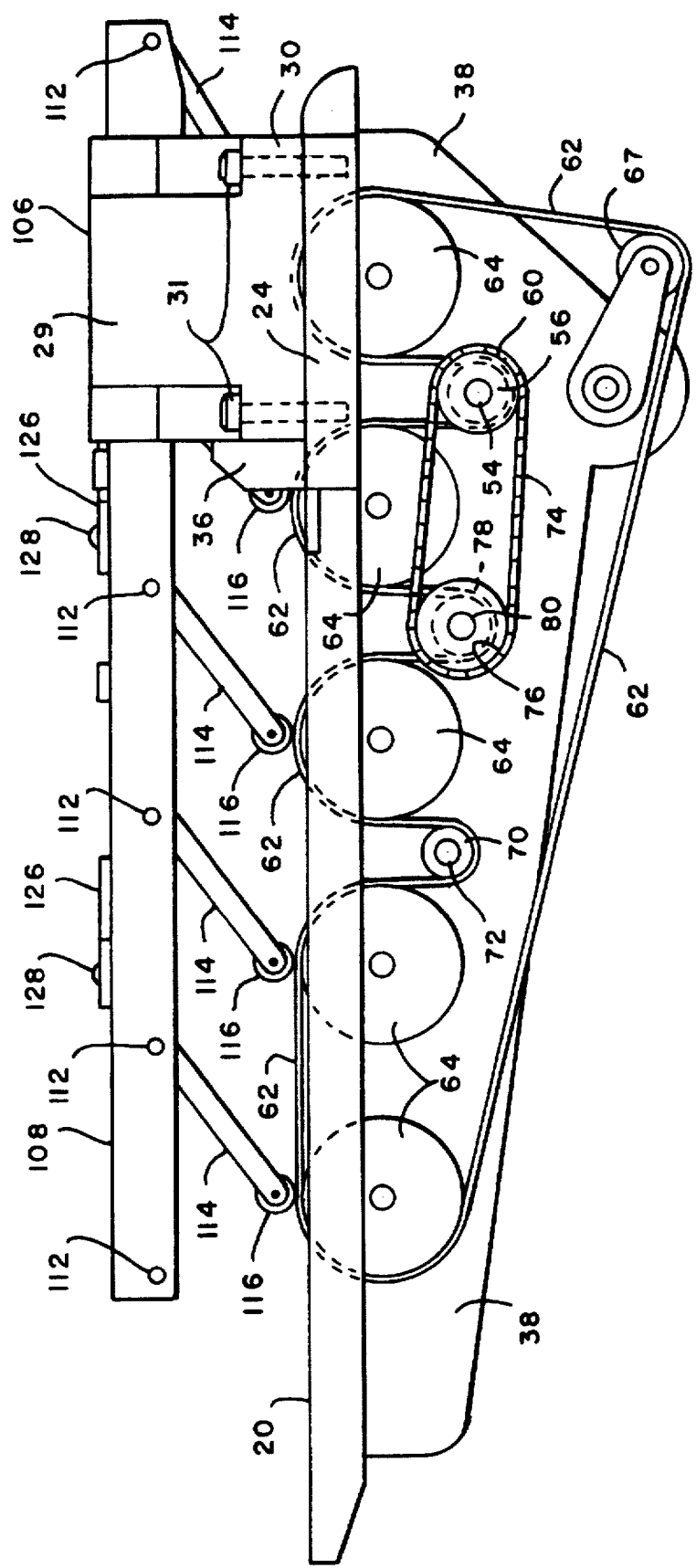
FIG. 3 is a side elevation of the weighing scale shown in FIGS. 1 and 2 looking at the rear portion of the scale.

Considering firstly the rear transport unit 44, and with particular reference to FIGS. 2, 3 and 5, it will be seen that the motor 48 has a drive shaft 54 on which a combined belt and chain drive pulley 56 is mounted. As best seen in FIG. 5, the pulley 56 has a hub 57 which is provided with a flat peripheral surface 58, and a plurality of conventional sprocket teeth 60 are formed on the outer end of the hub 57. The peripheral surface 58 is engaged by the smooth outer side of a drive belt 62 (of which a portion is removed in FIG. 5 for clarity) having ridges 63 formed on the back side thereof, and which follows a serpentine path around a plurality of idler rollers 64 mounted on the flange 38, the rollers 64 having grooves 65 on the outer surface thereof to match the ridges 63 on the belt 62 to provide proper tracking of the belt 62 around the rollers 64. A suitable spring biased pulley 67 is pivotally mounted on the flange 38 to maintain proper tension in the belt 62 around the various support pulleys. The belt 62 thus constitutes the drive means for the transport unit 44, and portions of the belt 62 protrude upwardly through a pair of long rectangular openings 66 and a short rectangular opening 68 formed in the platform 20 so as to project above the upper surface 22 of the platform 20 to contact mail pieces 12 on the platform 20. Thus, it will be seen that rotation of the motor shaft 54 and the pulley 56 will drive the belt 62 in a direction to move mail pieces 12 across the upper surface 22 of the platform 20. A smaller idler roller 70 is rotatably mounted on a stub shaft 72 secured to the flange 38, the roller 70 guiding the belt 62 downwardly so that it passes under the portion of the platform 20 which bridges between the long rectangular openings 66.

Figure 4:
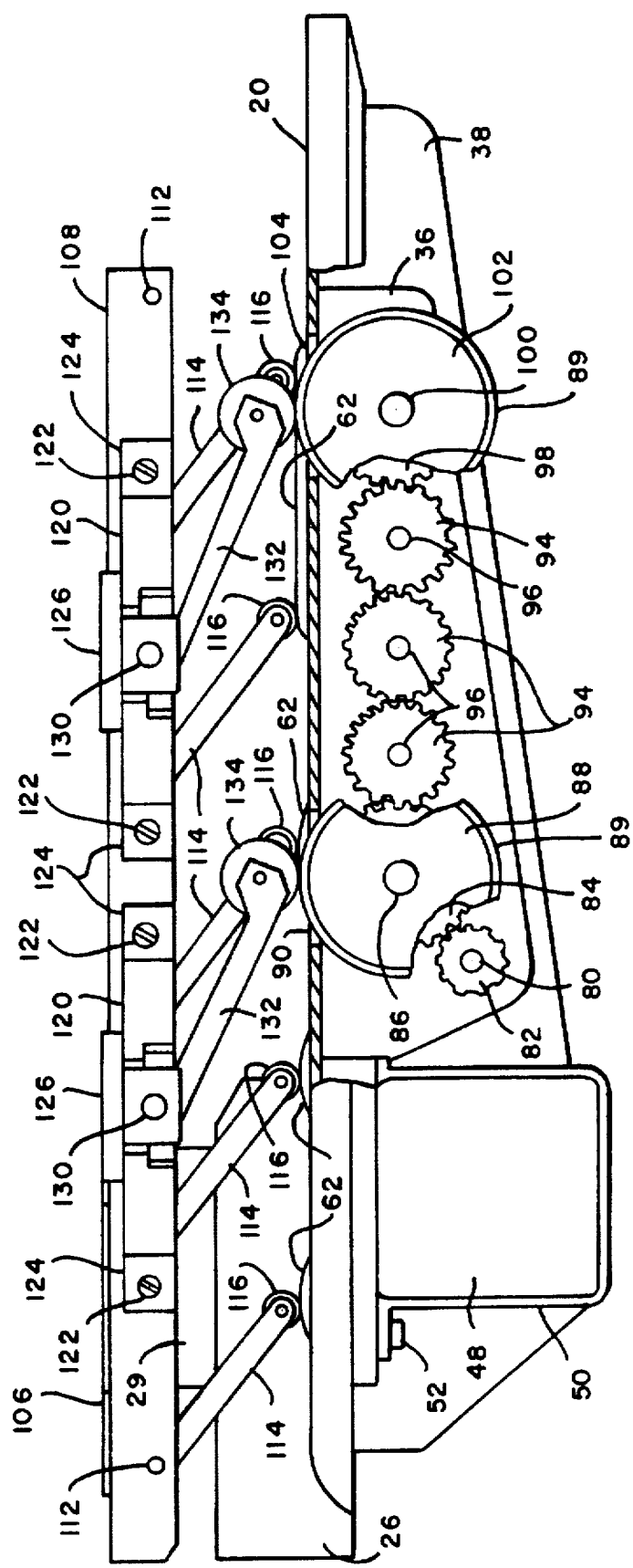
FIG. 4 is a view similar to FIG. 3 looking at the front portion of the scale.

Turning now to the forward transport unit 46, and with particular reference first to FIG. 3, it will be seen that the sprocket teeth 60 formed on the outer portion of the pulley 56 mesh with a drive chain 74 which also engages with similar teeth 76 on another pulley 78 rotatably mounted on a shaft 80 which is suitably journaled for rotation in the flange 38 and extends across the frame plate 34 to the forward flange 36 in which it is also journaled for rotation. With reference now to FIGS. 2, 4 and 5, it will be seen that a gear 82 is mounted on the shaft 80 to be driven thereby, the gear 82 meshing with another gear 84 mounted on a stub shaft 86 secured to the flange 36. A drive roller 88 is preferably formed integrally with the gear 84 and is covered with a suitable friction material 89, and has a diameter such that it extends through a suitable rectangular opening 90 formed in the platform 20 adjacent a forward or outboard edge 92 of the platform 20.

Three small transfer gears 94 are rotatably mounted on three stub shafts 96 secured to the flange 36 and function to transfer driving force to another large gear 98 rotatably mounted on a stub shaft 100, the gear 98 also having a drive roller 102 preferably formed integrally therewith which has a diameter such that it projects slightly above the surface 22 of the platform 20 through an opening 104. Thus, the gear and drive roller units 84/88 and 98/102 are identical. The drive rollers 88 and 102 constitute the drive means for the transport unit 46, the upper portions of which project above the upper surface of the scale platform 20 to contact mail pieces 12 on the platform 20. The drive rollers 88 and 102 constitute the drive means for the transport unit 46, the upper portions of which project above the upper surface 22 of the platform 20.

From the description thus far, it will be seen that when the motor 48 is activated, rotation of the drive shaft 54 and pulley 56 drives the belt 62 in a direction to cause mail pieces 12 to be fed from the upstream end of the scale platform 20 toward the opposite end. Appropriate software controlled electrical circuitry monitors the operation of the motor 48 in accordance with suitable mail piece positioning software which is part of the control system for the mail handling apparatus of which the scale 10 is a component. At the same time, the pulley 56 also drives the chain 74 and the pulley 78 which transfers the drive to the shaft 80 and the gear 82 on the opposite side of frame plate 34. The gear 82 then drives the gear 84 and drive roller 88 unit, which in turn drives the transfer gears 94 to drive the other gear and drive roller unit 98/102 in the same direction as the gear and roller unit 84/88.

In order to ensure an effective driving engagement between mail pieces 12 and both the segments of the drive belt 62 and the drive rollers 88 and 102 which project above the top surface of the platform 20, the weighing scale 10 includes the aforementioned pressure roller assembly 30 which provides a resilient pressure means for continuously urging the mail pieces into firm driving engagement with the belt 62 and rollers 88 and 102. Thus, with particular reference to FIGS. 1-4, it will be seen that the mounting bracket 28 includes a horizontally disposed wall 106 which overlies the lateral extension 26 of the platform 20. An elongate three-sided channel 108 is suitably secured to the outer end of the undersurface of the outer end of the wall 106 as by the screws 110. The channel 108 is provided with a plurality of shafts 112 spaced therealong which extend between opposite sides of the channel 108. Except for the shaft 112 at the extreme left end of the channel 108 as viewed in FIG. 3, a finger 114 is pivotally mounted on each of the shafts 112, and is urged downwardly from the channel 108 toward the platform 20 by any suitable means (not shown) such as torsion springs around the shafts 112 or tension springs acting between the channel 108 and the fingers 114. A pressure roller 116 is mounted for rotation at the lower end of each finger 114, and the fingers 114 are disposed along the channel 108 in such a manner that the pressure rollers 116 are disposed directly over the several idler rollers 64 which support a portion of the drive belt 62 above the surface 22 of the platform 20. It will be apparent that the pressure rollers 116 bearing on the upper surface of mail pieces 12 provide the necessary frictional engagement between the lower surface of the mail pieces 12 and the various segments of the drive belt 62 to ensure effective driving engagement between the mail pieces 12 and the belt 62.

The pressure roller assembly 30 also includes a pair of laterally extending, outwardly tapered arms 120 which are suitably secured to the forwardly facing side of the channel 108 as by screws 122 passing through flanges 124 formed on the rearward end of the arms 120. A flange 126 extends from the inner end of each arm 120 and overlies the upper side of the channel 108 and is secured thereto by screws 128 to add further stability to the arms 120. A shaft 130 is suitably mounted at the outer free end of each arm 120, and a finger 132 is pivotally mounted on each shaft 130, and as with the fingers 114, the fingers 132 are provided with suitable resilient means (not shown) for urging the fingers 132 downwardly from the arms 120 toward the platform 20. A pressure rollers 134 is rotatably mounted on the lower end of each finger 116, the location of the fingers 116 being such that the pressure rollers 134 overlie the drive rollers 84 and 102. Again, it will be apparent that the pressure rollers 134 bearing on the upper surface of mail pieces 12 provide the necessary frictional engagement between the lower surface of the mail pieces 12 and the drive rollers 88 and 102 to ensure effective driving engagement between the mail pieces 12 and the pressure rollers 88 and 102.

It was previously indicated that a highly significant unique feature of the present invention is that the entire mail piece transport means, including both the mail piece transport units and the corresponding pressure means, are fixedly mounted on the scale platform so that the weight of the transport means becomes part of the tare weight of the scale which is supported by the load cell when the scale is calibrated to 0 weight, and the manner in which this is accomplished has been heretofore described. The manner in which the weight of the scale platform and the transport means is transferred to the load cell will now be described. With reference to FIG. 2, a mounting base, generally indicated by the reference numeral 136, is seen to comprise an elongate frame member 138 having a pair of wings 140 formed at opposite ends of the frame member 138. The wings 140 are supported at their outer ends by a pair of feet 142, each foot 142 having opposed pairs of upper and lower flanges 144 and 146 respectively at the front and rear edges thereof, the outer ends of the wings 140 being disposed between the flanges 144 and 146. Suitable resilient bushings 148 are captured between adjacent surfaces of the outer ends of the wings and the flanges 148 to secure the feet 142 onto the wings and to provide a resilient support to the scale platform, transport assembly and load cell combination to provide for isolation of the weighing platform from vibrations emanating from either the operation of the mail processor itself or from other external equipment.

The frame member 138 includes a laterally extending platform 150 to which one longitudinal end of a load cell 152 is secured by means of suitable screws (not shown) extending upwardly through the platform 150 and into threaded apertures in the underside of the load cell 152. The other end of the load cell 152 is secured to the underside of the scale platform 20 by means of suitable screws 154 which extend downwardly through apertures in the scale platform 20 and into threaded apertures 156 formed in the upper surface of the load cell 150. It will be apparent that when the parts are assembled, the load cell 152 occupies the space defined within a rectangular aperture 158 formed in the frame plate 34 of the transport assembly 32.

From the foregoing, it will now be seen that the entire weight of the platform 20, the pressure roller assembly 30 and the transport assembly 32 are supported by the load cell 152 since the pressure roller assembly 30 is mounted on the upper surface of the platform 20 and the transport assembly 32 is mounted on the lower surface of the platform 20, and the platform 20 is mounted on the load cell 152. Thus, all of this structure constitutes the tare weight of the scale when it is calibrated to read 0 weight. During operation of the scale, when a mail piece 12 is moved onto the scale platform 20 by the transport units 44 and 46 and stopped thereon, the weight of the mail piece 12 is added to the tare weight and is recognized by the load cell. The scale is thus able to record the weight of the mail piece without any further movement of any part of the transport assembly.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

I claim:

1. A mailing processing apparatus comprising:

an elongate feed path; and a plurality of processing components disposed along the feed path for processing mail pieces moving seriatim along the feed path;

wherein at least one of said processing components is a weighing scale for weighing mail pieces, said weighing scale including a mounting base, a load cell fixedly connected to said mounting base, a scale platform mounted on said load cell and positioned such that an upper surface thereof is aligned with and forms a segment of the feed path, transport means for moving mail pieces across said scale platform along a direction of said feed path, and means for mounting said transport means on said scale platform whereby the tare weight of both said scale platform and said transport means is imposed on said load cell prior to said load cell being subjected to the weight of a mail piece;

wherein said transport means includes first and second transport units which are laterally spaced from each other in a direction transverse to said direction of said feed path, said first and second transport units respectively including first and second drive means which each have a portion thereof projecting above the upper surface of said scale platform which first and second drive means cooperate together to move mail pieces across said scale platform and to prevent mail pieces from skewing out of alignment during movement across said scale platform, wherein said transport means further includes first and second resilient pressure means mounted on said scale platform in respective overlying relationship to said first and second drive means for maintaining mail pieces in firm driving engagement with said first and second drive means, said first and second resilient pressure means also forming part of the tare weight on said load cell.

2. An apparatus as set forth in claim 1 wherein said means for mounting said transport means on said scale platform comprises a mounting bracket secured to the underside of said scale platform.

3. An apparatus as set forth in claim 2 wherein said mounting bracket comprises a flat generally rectangular plate having downturned first and second flanges respectively extending along opposite longitudinal edges of said plate, said first and second transport units being respectively mounted in said first and second flanges, and said plate having an aperture through which said load cell projects to permit said scale platform to be connected to the upper surface of said load cell.

4. An apparatus as set forth in claim 1 wherein said first and second resilient pressure means are each connected to an elongate frame disposed on said scale platform in overlying relationship to said upper surface, and wherein each of said first and second resilient pressure means includes first and second groups of arms, each of said arms being pivotally connected to said frame and biased downwardly toward said upper surface of said scale platform and wherein each of said arms of said first group of arms include first pressure means on a free end of each arm of said first group of arms, which first pressure means are each disposed in overlying relationship to said first drive means for pressing mail pieces into firm engagement with said first drive means, and each of said arms of said second group of arms include second pressure means on a free end of each arm of said second group of arms, which second pressure means are each in overlying relationship to said second drive means for pressing mail pieces into firm engagement with said second drive means.

* * * * *